(12) United States Patent
Matsushita et al.

(10) Patent No.: US 6,501,521 B2
(45) Date of Patent: Dec. 31, 2002

(54) TRANSMISSION/REFLECTION TYPE COLOR LIQUID CRYSTAL DISPLAY DEVICE

(75) Inventors: Tomohisa Matsushita; Kazuya Yoshimura; Tohru Sakuwa, all of Nara (JP)

(73) Assignee: Sharp Kabushiki Kaisha, Osaka (JP)

(*) Notice: Subject to any disclaimer, the term of this patent is extended or adjusted under 35 U.S.C. 154(b) by 0 days.

(21) Appl. No.: 10/092,421

(22) Filed: Mar. 7, 2002

(65) Prior Publication Data
US 2002/0126238 A1 Sep. 12, 2002

(30) Foreign Application Priority Data

| Mar. 7, 2001 | (JP) | 2001-062925 |
| Oct. 11, 2001 | (JP) | 2001-314129 |
| Feb. 28, 2002 | (JP) | 2002-052821 |

(51) Int. Cl.[7] .............................. G02F 1/1325
(52) U.S. Cl. ........................ 349/106; 349/113
(58) Field of Search .................... 349/113, 106, 349/107

(56) References Cited

U.S. PATENT DOCUMENTS 6,124,909 A * 9/2000 Miyashita et al. .......... 349/113
6,215,538 B1 * 4/2001 Narutaki et al. ............ 349/113
6,259,500 B1 * 7/2001 Kijima et al. ............... 349/113

FOREIGN PATENT DOCUMENTS

| JP | 11-52366 A | 2/1999 |
| JP | 11-183892 A | 7/1999 |
| JP | 2000-29012 A | 1/2000 |
| JP | 2000-89248 A | 3/2000 |
| JP | 2000-111902 A | 4/2000 |

* cited by examiner

Primary Examiner—James A. Dudek
(74) Attorney, Agent, or Firm—Nixon & Vanderhye, P.C.

(57) ABSTRACT

A liquid crystal display device, including: a first substrate; a second substrate; opposing the first substrate; a liquid crystal layer interposed between the first substrate and the second substrate; a reflection film formed on one side of the second substrate that is closer to the liquid crystal layer; and a color filter formed on the reflection film, wherein: a plurality of pixel regions are arranged in a matrix pattern, each of the pixel regions including a reflection region where light coming from the first substrate side is reflected by the reflection film back to the first substrate side, and a transmission region where light coming from the second substrate side is transmitted to the first substrate side; and the color filter includes an opening in the reflection region.

11 Claims, 11 Drawing Sheets

◆ Embodiment of present invention   Y=43 Thickness 0.8 μm
□ Comparative Example 1             Y=60 Thickness 1.4 μm

TRANSMISSION/REFLECTION TYPE COLOR LIQUID CRYSTAL DISPLAY DEVICE

BACKGROUND OF THE INVENTION

1. Field of the Invention

The present invention relates to a transmission/reflection type (hereinafter "transflective") color liquid crystal display device having both reflection and transmission functions. A transflective color liquid crystal display device operates in a reflection display mode using ambient light from around the device under bright environments and in a transmission display mode using light from the backlight under dark environments. The liquid crystal display device of the present invention is suitable for use in various applications, including OA equipment such as word processors and personal computers, personal digital assistants such as electronic organizers, and camcorders with a liquid crystal monitor.

2. Description of the Background Art

A transflective color liquid crystal display device in portable equipment, etc., has a reduced power consumption and is capable of operating in a transmission display mode using a backlight, whereby it is suitable for use under various environments, and the use thereof as a display device in portable equipment, etc., is becoming widespread.

A conventional transflective color liquid crystal display device includes a color filter layered on a reflection film that is formed on a reverse-side substrate for producing a color display, and the reflection film is a transflective reflection film including light-transmitting openings in some portions thereof.

The color filter and the reflection film are formed within the liquid crystal panel so as to prevent the display color saturation from lowering due to the parallax caused by the substrate thickness, and a color filter with a high transmittance is employed in order to gain brightness in a reflection mode.

Other semi-transmissive reflection films include half mirror films obtained by thinning a metal such as aluminum or silver, those obtained by patterning a metal through an etching process so that portions thereof where the metal is left unetched are used in a reflection mode while other portions where the metal is removed are used in a transmission mode, and those utilizing interference which are obtained by layering dielectric layers of different refractive indices on one another.

One such liquid crystal display device is disclosed in, for example, Japanese Laid-Open Patent Publication No. 11-052366, where a color filter is layered on a reflection film that is formed on a reverse-side substrate, and the reflection film includes light-transmitting openings in some portions thereof that are opposing pixels of the color filter.

Japanese Laid-Open Patent Publication No. 11-183892 proposes a liquid crystal display device in which openings are provided in a color filter on a front-side substrate, a reflection film is provided on the inner surface of a backside substrate in positions corresponding to the openings of the color filter, and a semi-transmissive reflector is provided on the reverse surface of the back-side substrate. It is stated that with this arrangement, it is possible to display an image through color pixels with a high brightness in a reflection display mode by using colored light that passes through portions of the color filter other than the openings and is reflected by the semi-transmissive reflector and non-colored light of a high brightness that passes through the openings of the color filter and is reflected by the reflection film, while it is possible to display an image through color pixels with a high contrast in a transmission display mode by outputting, to the front side of the device, only the colored light that has passed through the portions of the color filter other than the openings.

However, if a color filter with a high transmittance for gaining brightness in a reflection mode is employed in the liquid crystal display device described in Japanese Laid-Open Patent Publication No. 11-052366, although the display color saturation is high in a reflection display mode since light passes through the color filter twice, the display color saturation decreases considerably in a transmission display mode since light passes through the color filter only once. Moreover, if a color filter with a high saturation (low transmittance) is employed in an attempt to increase the display color saturation in a transmission display mode, the brightness in a reflection display mode decreases considerably, thereby lowering the visibility significantly.

The liquid crystal display device described in Japanese Laid-Open Patent Publication No. 11-183892 requires two reflection films. Moreover, reflected light from the reflection film on the inner surface of the back-side substrate and reflected light from the transflective reflector on the reverse surface of the back-side substrate are both used, thereby causing problems such as a decrease in the color purity due to the parallax caused by the presence of the back-side substrate.

The present inventors have found that when any of the layers of a transflective color liquid crystal display device provided on the viewer side with respect to the reflection film (e.g., a viewer-side substrate, an overcoat film, a liquid crystal layer, an alignment film, etc.) is colored in a particular color, a color displayed image as a whole is colored in the particular color not only in a reflection display mode but also in a transmission display mode, thereby causing a decrease in the color reproducibility, which has not been significant in a black and white display.

Moreover, in recent years, there is an increasing demand for reducing the thickness/weight of a transflective color liquid crystal display device. Accordingly, there has been an active research for commercializing a display device using a plastic substrate instead of using a glass substrate as in the prior art.

However, when a transflective color liquid crystal display device is produced by using a plastic substrate instead of using a glass substrate as in the prior art, a colorless and transparent plastic substrate gets yellowish in some cases through a production process such as heating during a color filter deposition, a transparent electrode film deposition or an alignment film deposition. In such a case, the color displayed image as a whole gets yellowish not only in a reflection display mode but also in a transmission display mode, thereby causing a decrease in the color reproducibility.

SUMMARY OF THE INVENTION

A liquid crystal display device of the present invention includes: a first substrate; a second substrate opposing the first substrate; a liquid crystal layer interposed between the first substrate and the second substrate; a reflection film formed on one side of the second substrate that is closer to the liquid crystal layer; and a color filter formed on the reflection film, wherein: a plurality of pixel regions are arranged in a matrix pattern, each of the pixel regions including a reflection region where light coming from the first substrate side is reflected by the reflection film back to the first substrate side, and a transmission region where light coming from the second substrate side is transmitted to the first substrate side; and the color filter includes an opening in the reflection region.

Thus, in the liquid crystal display device of the present invention, the opening of the color filter is provided in the reflection region of each pixel so that the opening does not overlap with the transmission region.

With the liquid crystal display device of the present invention, in a transmission display mode where a light source provided on the back side of the liquid crystal display device is used, light that is transmitted through the transmission region passes through the color filter to the outside, thereby obtaining a bright display with a satisfactory display color saturation. Desired characteristics can be obtained by adjusting the luminance of the light source, the area and shape of the transmission region on the second substrate, and the saturation, transmittance and thickness of the color filter.

The transmission region is usually a region where the reflection film is not formed. However, the term "transmission region" may include a region of the reflection film where the thickness thereof is reduced so that light from the light source provided on the back side of the liquid crystal display device is transmitted through the region with a transmittance of 90% or more, and preferably 95% or more. The term "reflection region" includes not only a region where light from the first substrate side (viewer side) is reflected in total reflection (reflectance: 100%), but also a region where the light from the first substrate side is reflected with a reflectance of 90% or more, and preferably 95% or more, with a portion of the light being transmitted.

In a reflection display mode where ambient light is used, light entering the liquid crystal display device from the front side (viewer side) passes through the color filter or the color filter openings, is reflected by the reflection regions of the reflection film, and passes again through the color filter or the color filter openings to the outside, whereby combined output light of non-colored output light and colored output light is obtained, thus realizing a bright display. The brightness and saturation of the output light can be adjusted by adjusting, as necessary, the characteristics of the color filter and the area and shape of the color filter openings. By enlarging the color filter openings, a color filter having a high color purity can be employed.

In the liquid crystal display device of the present invention, it is preferred that the color filter includes a plurality of openings in the reflection region. In this way, non-colored output light is output to the first substrate side while being dispersed across each pixel in a reflection display mode, whereby bright regions are dispersed across each pixel, thus improving the visibility.

In the liquid crystal display device of the present invention, it is preferred that the reflection film is a diffused reflection film whose surface on the liquid crystal layer side has irregularities. In this way, in a reflection display mode, reflected light from the reflection film passes through the color filter to the first substrate side while being diffused, whereby the brightness and the saturation of the combined output light are made uniform across each pixel, thus improving the visibility.

In the liquid crystal display device of the present invention, it is preferred that an area proportion of the transmission region with respect to the pixel region is equal to or greater than 10% and less than or equal to 50%, and an area proportion of the opening with respect to the reflection region is equal to or greater than 5% and less than or equal to 30%. In this way, it is possible to realize a transflective color liquid crystal display device that is satisfactory for practical use in a reflection display mode and in a transmission display mode. Specifically, a sufficient brightness can be ensured in a transmission display mode by setting the area proportion of the region where the reflection film is not formed (i.e., the transmission region) to be 10% or more, and a sufficient brightness can be ensured in a reflection display mode by setting it to be 50% or less. On the other hand, a sufficient brightness can be ensured in a reflection display mode by setting the color filter opening proportion to be 5% or more, and a sufficient color area can be ensured in a reflection display mode, whereby different colors can be distinguished from one another, by setting it to be 30% or less. In order to perform an evaluation in a reflection display mode, the color filter opening proportion is herein represented in relation to the area of the reflection region. This is because the size of the opening of the color filter significantly influences a reflection display.

In the present specification, a region of a liquid crystal display device corresponding to a "pixel", which is the minimum unit of display, will be referred to as a "pixel region". In a color liquid crystal display device, for example, R, G and B "pixel regions" correspond to one "picture element region". In a passive matrix type liquid crystal display device, a pixel region is defined as a region where one of column electrodes which are arranged in a stripe pattern crosses one of row electrodes which are also arranged in a stripe pattern perpendicular to the column electrodes. In an active matrix type liquid crystal display device, a pixel region is defined by a pixel electrode and a counter electrode which opposes the pixel electrode. In an arrangement with a black matrix, strictly speaking, a pixel region is a portion of each region through which a voltage is applied according to the intended display state that corresponds to an opening of the black matrix.

In the liquid crystal display device of the present invention, it is preferred that the openings of the color filter are filled with a transparent resin whose transmittance is 90% or more. In this way, the step around each color filter opening is eliminated, whereby the liquid crystal molecules rise in a uniform manner in the vicinity of each color filter opening, thus improving the contrast (particularly the contrast in a reflection mode). A flattening film made of an acrylic resin is layered on the surface of the color filer for flattening the surface irregularities of the color filter. Thus, when the color filter openings are shallow, the openings are filled with the flattening film. However, when the color filter openings are deep, unless the openings are filled with a transparent resin, the step around each opening cannot be eliminated by the flattening film, thus leaving a step. Particularly when an STN liquid crystal material is used, the liquid crystal molecules rise in a non-uniform manner in each pixel due to the presence of such a step around each color filter opening, thereby causing significant problems such as a reduction in the contrast in a reflection display mode.

A transparent resin may be of any type as long as the transmittance thereof is higher than that of the color filter. However, in order to ensure a sufficient brightness in a transmission display mode, a high transmittance is preferred. Even if a pigment for tint correction is mixed in the transparent resin, it is desirable to ensure a transmittance of 90% or more, and preferably 95% or more.

In the liquid crystal display device of the present invention, it is preferred that: a plurality of picture element regions are defined, each including a number of the pixel regions of different colors; and in each of the plurality of picture element regions, an area of the opening of the color filter in at least one of the pixel regions of different colors is smaller than an area of the opening of the color filter in each of the other pixel region(s).

With such a liquid crystal display device, if reflected light is colored in a particular color by a layer provided on the viewer side with respect to the reflection film (e.g., the first substrate, the overcoat film, the liquid crystal layer, the alignment film, etc.), the area proportion of a color filter of a hue that is approximately the complementary color to that particular color can be increased relative to those of the color filters of other hues. Therefore, it is possible to realize a reflection color display with a desirable color reproducibility in a reflection display mode.

The liquid crystal display device of the present invention may be such that: the first substrate is a plastic substrate; a plurality of picture element regions are defined, each including three of the pixel regions of red, green and blue; and in each of the plurality of picture element regions, an area of the opening of the color filter in the blue pixel region is smaller than an area of the opening of the color filter in each of the red and green pixel regions.

With such a liquid crystal display device, if a transparent plastic substrate (the first substrate) provided on the viewer side with respect to the reflection film gets yellowish through a production process, the area proportion of the color filter of blue, which is approximately the complementary color to yellow, can be increased relative to those of the red and green color filters. Therefore, in a reflection display mode, the reflected light can be approximately white light in a white display, thereby realizing a reflection color display with a desirable color reproducibility.

In the liquid crystal display device of the present invention, it is preferred that: a plurality of picture element regions are defined, each including a number of the pixel regions of different colors; and in each of the plurality of picture element regions, an area of the transmission region in at least one of the pixel regions of different colors is greater than an area of the transmission region in each of the other pixel region(s).

With such a liquid crystal display device, if transmitted light is colored in a particular color by a light source such as a backlight, or a layer present in the path along which light from the light source travels (e.g., the light guide plate, the first substrate, the second substrate, the liquid crystal layer, etc.), the area proportion of the color filter of a color that is approximately the complementary color to that particular color can be increased relative to those of the color filters of other hues. Therefore, it is possible to realize a transmission color display with a desirable color reproducibility in a transmission display mode.

In the liquid crystal display device of the present invention, it is preferred that: at least one of the first substrate and the second substrate is a plastic substrate; a plurality of pixel regions are defined, each including three of the pixel regions of red, green and blue; and in each of the plurality of pixel regions, an area of the transmission region in the blue pixel region is greater than an area of the transmission region in each of the red and green pixel regions.

With such a liquid crystal display device, if a transparent plastic substrate present in the path along which light from a light source such as a backlight travels gets yellowish through a production process, the area proportion of the color filter of blue, which is approximately the complementary color to yellow, can be increased relative to those of the red and green color filters. Therefore, in a transmission display mode, the transmitted light can be approximately white light in a white display, thereby realizing a transmission color display with a desirable color reproducibility.

In the liquid crystal display device of the present invention, it is preferred that: a plurality of picture element regions are defined, each including a number of the pixel regions of different colors; and in each of the plurality of picture element regions, an area of the opening of the color filter in at least one of the pixel regions of different colors is smaller than an area of the opening of the color filter in each of the other pixel region(s), and an area of the transmission region in at least one of the pixel regions of different colors is greater than an area of the transmission region in each of the other pixel region(s).

With such a liquid crystal display device, if reflected light or transmitted light is colored in a particular color by a layer provided on the viewer side with respect to the reflection film, a light source such as a backlight, a layer present in the path along which light from the light source travels, etc., the area proportion of the color filter of a hue that is approximately the complementary color to that particular color can be increased relative to those of the color filters of other hues. Therefore, it is possible to realize a reflection color display with a desirable color reproducibility in a reflection display mode and in a transmission display mode.

In the liquid crystal display device of the present invention, it is preferred that: at least one of the first substrate and the second substrate is a plastic substrate; a plurality of pixel regions are defined, each including three of the pixel regions of red, green and blue; and in each of the plurality of pixel regions, an area of the opening of the color filter in the blue pixel region is smaller than an area of the opening of the color filter in each of the red and green pixel regions, and an area of the transmission region in the blue pixel region is greater than an area of the transmission region in each of the red and green pixel regions.

With such a liquid crystal display device, if a transparent plastic substrate provided on the viewer side with respect to the reflection film or in the path along which light from a light source such as a backlight travels gets yellowish through a production process, the area proportion of the color filter of blue, which is approximately the complementary color to yellow, can be increased relative to those of the red and green color filters. Therefore, in a reflection display mode and in a transmission display mode, the reflected light and the transmitted light can be approximately white light in a white display, thereby realizing a transmission color display with a desirable color reproducibility.

DETAILED DESCRIPTION OF THE PREFERRED EMBODIMENTS

Embodiments of the present invention will now be described with reference to the accompanying drawings. Although the present invention will be described in the following embodiments with respect to a passive matrix STN liquid crystal display device, the present invention is also applicable to an active matrix liquid crystal display device using switching elements such as TFTs (Thin Film Transistors) or MIM (Metal-Insulator-Metal) devices.

EMBODIMENT 1

Figure 1:
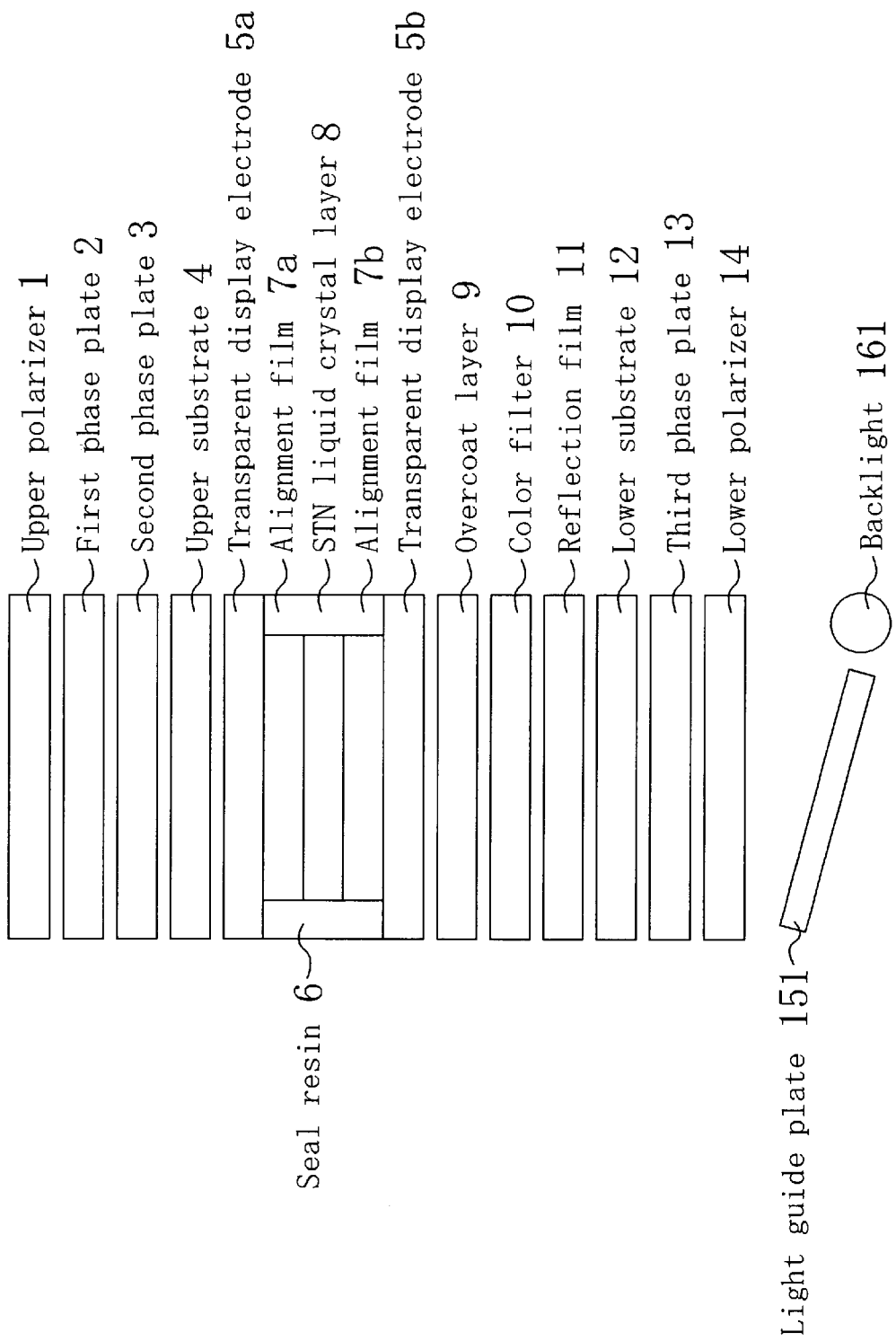
FIG. 1 is a diagram schematically illustrating a transflective color liquid crystal display device according to an embodiment of the present invention.

FIG. 1 is a diagram schematically illustrating a transflective color liquid crystal display device of the present embodiment. The transflective color liquid crystal display device of the present embodiment includes an upper polarizer 1, a first phase plate 2, a second phase plate 3, an upper substrate 4, a transparent display electrode 5a, an alignment film 7a, an STN liquid crystal layer 8, an alignment film 7b, a transparent display electrode 5b, an overcoat layer 9, a color filter 10, a reflection film 11, a lower substrate 12, a third phase plate 13, a lower polarizer 14, a light guide plate 151 and a backlight 161. These components are layered in this order from the viewer side (the upper side in FIG. 1).

The upper substrate 4 and the lower substrate 12 are attached to each other via a seal resin 6 therebetween, thereby forming the STN liquid crystal layer 8.

The liquid crystal display device of the present embodiment includes a plurality of pixel regions arranged in a matrix pattern, each pixel region including a reflection region where light coming from the upper substrate 4 side is reflected by the reflection film 11 back to the upper substrate 4 side, and a transmission region where light coming from the lower substrate 12 side is transmitted to the upper substrate 4 side.

Figure 2:
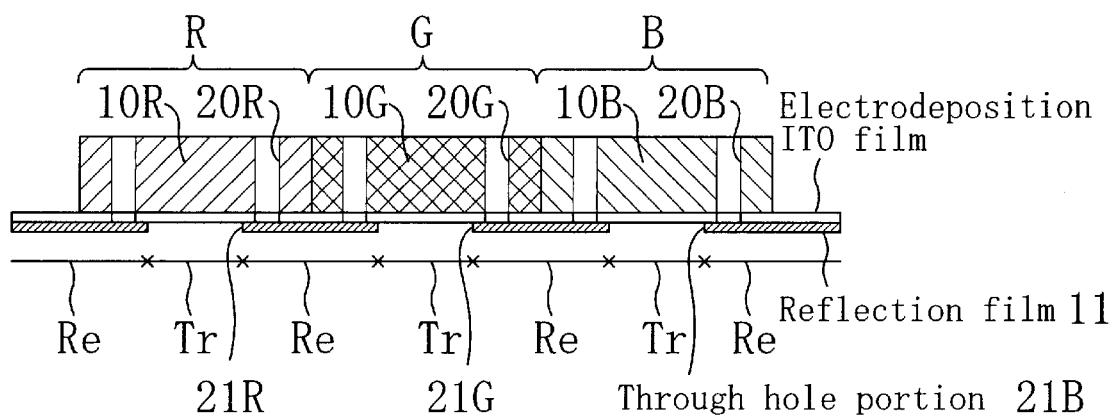
FIG. 2 is a cross-sectional view of a color filter 10 and a reflection film 11, illustrating the positional relationship of reflection regions Re and transmission regions Tr with respect to openings of the color filter.

FIG. 2 is a cross-sectional view of the color filter 10 and the reflection film 11, illustrating the positional relationship of reflection regions Re and transmission regions Tr with respect to openings of the color filter. In the illustrated example, a pixel region including a reflection region Re and a transmission region Tr is formed in each of red (R), green (G) and blue (B) pixels, and each of color filters 10R, 10G and 10B of each pixel includes a plurality of openings 20R, 20G and 20B, respectively, with each of the respective openings 20R, 20G and 20B of the color filters 10R, 10G and 10B being provided in a reflection region Re. Hereinafter, components may be referred to collectively using a reference numeral by omitting alphabetical suffixes to the reference numeral. For example, "color filters 10R, 10G and 10B" may be referred to collectively as "color filter 10".

In the present embodiment, light-transmitting through hole portions 21 are formed by using a photolithography method in the reflection film 11 covering one side of the lower substrate 12, thereby forming transmission regions Tr. Therefore, a transmission region Tr may be described as the opening (light-transmitting region) 21 of the reflection film 11. Thus, the liquid crystal display device of the present embodiment may be described as a transflective color liquid crystal display device in which the liquid crystal layer 8 is interposed between the pair of substrates 4 and 12, and the color filter 10 and the reflection film 11 including the openings (light-transmitting regions) are provided in each pixel region, which is the unit of display, wherein the openings 20 of the color filter 10 are provided in positions corresponding to portions of the reflection film 11 other than the openings (light-transmitting regions) thereof.

Figure 3:
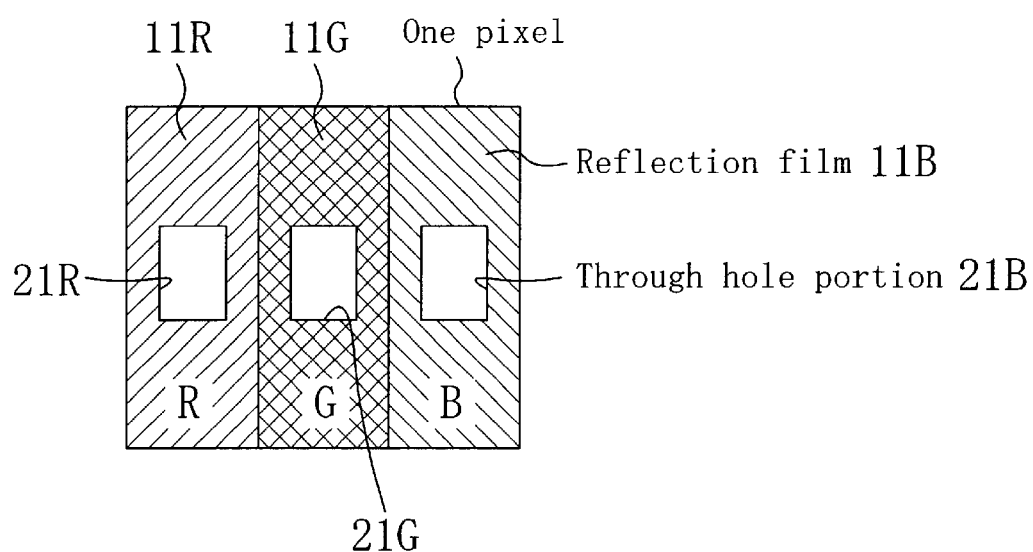
FIG. 3 is a plan view illustrating the reflection film 11 used in the embodiment of the present invention in each of red (R), green (G) and blue (B) pixel regions.

FIG. 3 is a plan view illustrating the reflection film 11 used in the present embodiment in each of the red (R), green (G) and blue (B) pixel regions. The reflection film 11 is formed on the lower substrate 12 through a vapor deposition process using aluminum to a thickness of 1000 Å (100 nm), and the light-transmitting through hole portions 21 are formed by patterning the aluminum film using a photolithography method.

In the present embodiment, the area of each through hole portion 21 on the lower substrate 12 is set to be 30% with respect to the area of each pixel region on the lower substrate 12. While the area proportion of the through hole portion 21 is not limited thereto, it is preferably equal to or greater than 10% and less than or equal to 50%. If the area proportion of the through hole portion 21 is less than 10%, the amount of transmitted light used is insufficient, resulting in a dark display in a transmission display mode. If the area proportion of the through hole portion 21 is greater than 50%, while the transmission display mode is given a higher priority, the display in a reflection display mode becomes dark, resulting in a poor visibility.

For example, an electrodeposition method may be used for producing the color filter 10 including the openings 20.

An example of a process of producing the color filter 10 using an electrodeposition method will now be described. An electrodeposition ITO film (electrode) is formed on the reflection film 11. Openings running through the electrodeposition ITO film in the thickness direction thereof are formed by a photolithography method in positions corresponding to positions in the color filter 10 where the openings 20 are to be formed. A resist is formed on the electrodeposition ITO film, and then portions of the resist are removed from pixel regions of the color to be electrodeposited. An electric current is supplied to the electrodeposition ITO film so that a color filter material of the color to be electrodeposited is allowed to be electrodeposited on exposed portions of the electrodeposition ITO film. In this process, the color filter material is not electrodeposited in the opening regions of the electrodeposition ITO film, whereby the openings 20 are formed in the color filter 10. The resist is removed, and then a new resist is formed on the electrodeposition ITO film. Portions of the resist are removed from pixel regions of the next color to be electrodeposited. Similarly, the color filters 10 of other colors are formed.

While an electrodeposition method is used in the present embodiment, the color filter 10 including the openings 20 may alternatively be produced by using any of other methods for producing a color filter that are commonly used in the art, including a pigment dispersion method, a printing method, a dyeing method, etc.

Figure 4:
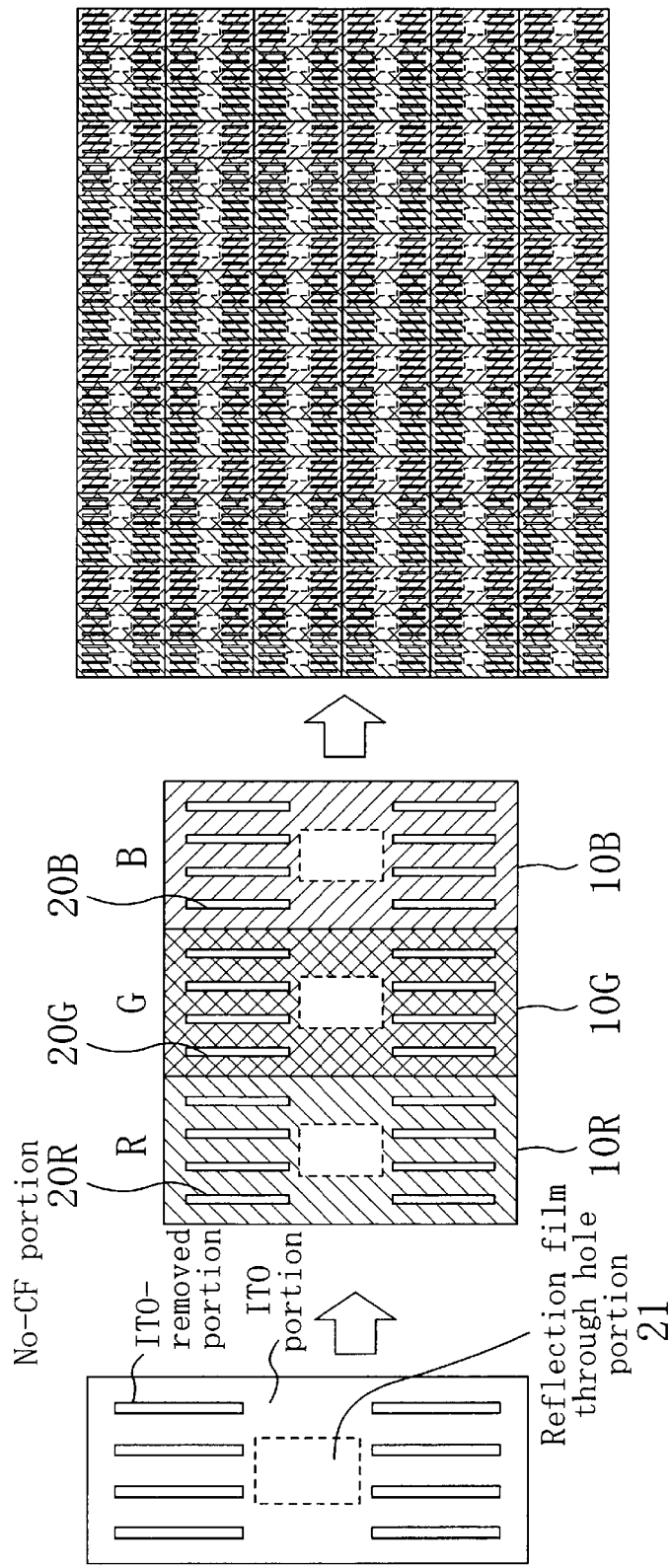
FIG. 4 is a plan view illustrating the reflection film 11, an electrodeposition ITO film and the color filter 10.

FIG. 4 is a plan view illustrating the reflection film 11, the electrodeposition ITO film and the color filter 10. The left portion of FIG. 4 is a plan view illustrating one pixel, where an electrodeposition ITO film has been formed on the reflection film 11 through a vapor deposition process and patterned to form a plurality of slit-shaped ITO-film-removed portions. The center portion of FIG. 4 illustrates the color filters (CF) 10R, 10G and 10B of red (R), green (G) and blue (B) pixels having been electrodeposited on the electrodeposition ITO film. The right portion of FIG. 4 illustrates red (R), green (G) and blue (B) pixels arranged in a matrix pattern. In the present embodiment, the through hole portions 21 of the reflection film 11 are each formed substantially in the center of one pixel region as illustrated in FIG. 4. Two (upper and lower) sets of four openings 20 extending in the column direction and parallel to one another are formed in the color filter 10 for each pixel, with the through hole portion 21 of the reflection film 11 being interposed between the upper and lower sets of openings 20. Since the color filter 10 includes a plurality of openings 20 in each reflection region Re, non-colored output light is output to the upper substrate 4 side while being dispersed across each pixel in a reflection display mode. Thus, bright regions are dispersed across each pixel, thereby improving the visibility.

Optimal opening area proportions for the reflection film 11 and those for the color filter 10 will now be discussed. In the following discussion, the term "reflection film opening proportion" is defined as the proportion of the area of the openings in the reflection film for one pixel region with respect to the area of one pixel region, and the term "color filter opening proportion" is defined as the proportion of the area of the openings in the color filter with respect to the area across which the reflection film is formed in one pixel region. Note that the area of one pixel, that of an opening in the reflection film, and that of an opening in the color filter, are each an area as viewed in the direction normal to the substrate plane, i.e., an area that is defined in a plane parallel to the substrate plane.

Figure 6:
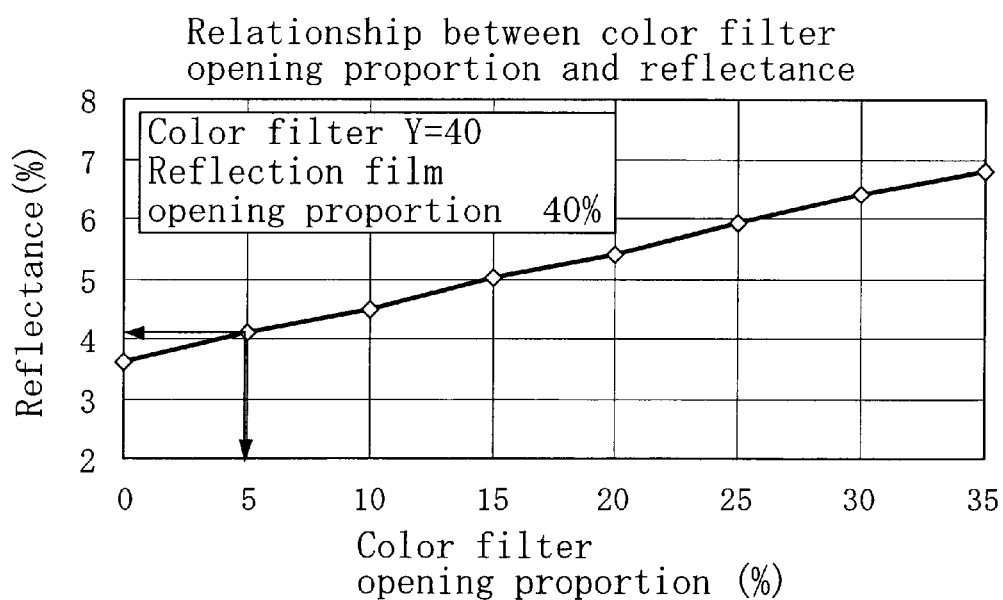
FIG. 6 is a graph illustrating the reflectance for various color filter opening proportions.
Figure 7:
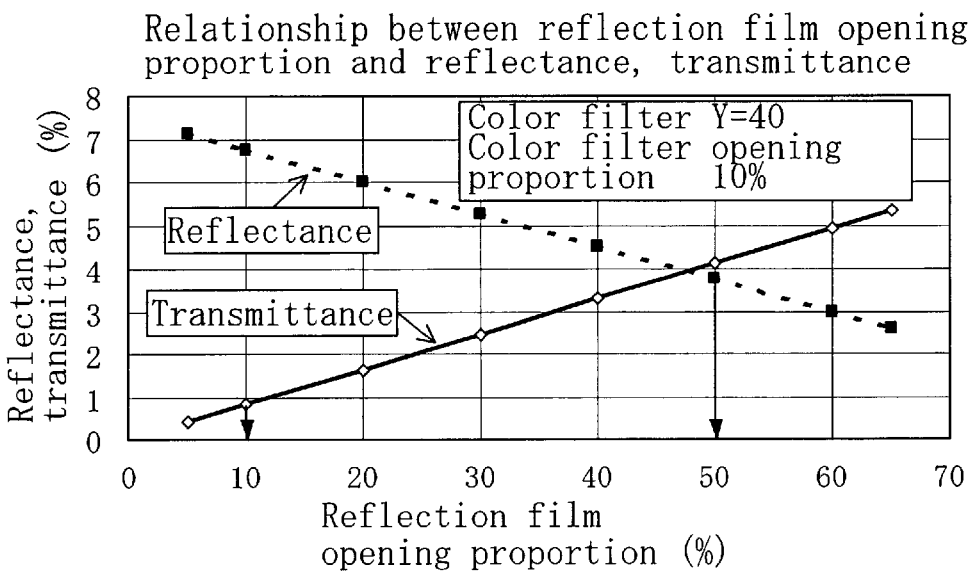
FIG. 7 is a graph illustrating the reflectance and the transmittance for various reflection film opening proportions.

A number of liquid crystal display devices were produced with various reflection film opening proportions and various color filter opening proportions, and the optical characteristics thereof were measured in a reflection display mode and in a transmission display mode. The results are shown in FIG. 5, FIG. 6 and FIG. 7.

Figure 5:
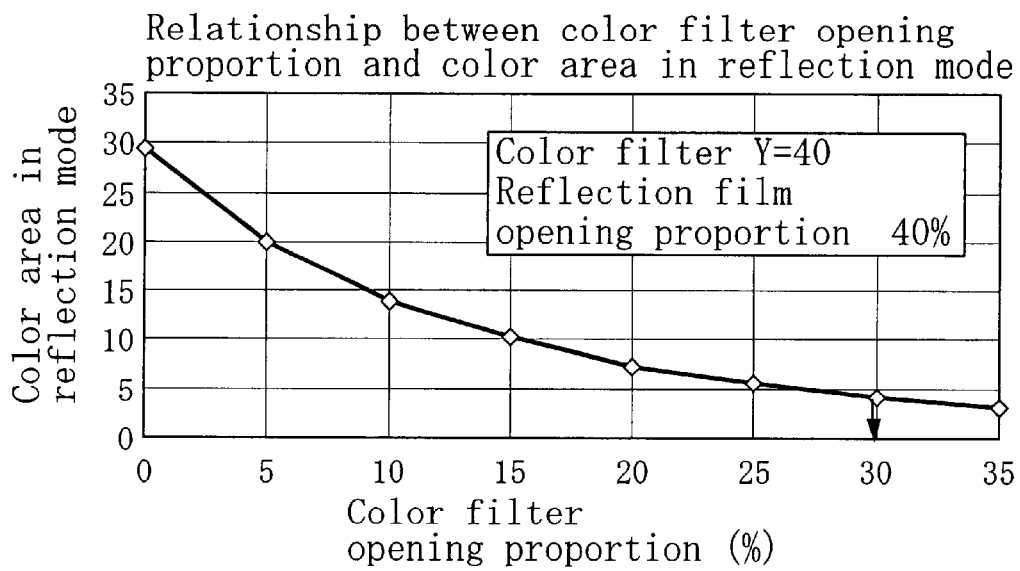
FIG. 5 is a graph illustrating the color reproducibility in a reflection display mode for various color filter opening proportions.

FIG. 5 is a graph illustrating the color reproducibility in a reflection display mode for various color filter opening proportions, i.e., the relationship between the color filter opening proportion and the color area in a reflection display mode. Color area is a value that can be used as a color reproducibility index, and is defined as follows, indicating that the greater the color area is, the better the color reproducibility is.

Color area=Area of "RGB triangle" ×1000

(where "RGB triangle" is a triangle that is drawn by connecting the three chromaticity coordinate points for R, G and B from one to another)

The measurement results shown in FIG. 5 were obtained by using a reflection film having a reflection film opening proportion of 40% and a color filter having a Y value of 40.

FIG. 6 is a graph illustrating the reflectance for various color filter opening proportions. The measurement results shown in FIG. 6 were obtained by using a reflection film having a reflection film opening proportion of 40% and a color filter having a Y value of 40, as in the measurement whose results are shown in FIG. 5.

The measurement results shown in FIG. 5 and FIG. 6 indicate that an increase in the color filter opening proportion decreases the color area in a reflection display mode but increases the reflectance. The measurement results shown in FIG. 5 indicate that when the color area in a reflection mode is less than 4, the color difference between R, G and B is excessively small, whereby it is difficult to distinguish different colors from one another particularly in the case of a multicolor display. It was found that such a liquid crystal display device produces a blur display and is not suitable for practical use. Thus, it is preferred to set the upper limit of the color filter opening proportion to be 30% at which the color area is 4.

Since ambient light is used in a reflection display mode, the display quality in a reflection mode is dependent on the brightness of the environment under which the device is used. Under very bright environments, e.g., being outdoors in a fine weather, the display is sufficiently recognizable even if the reflectance is about 1%. However, under office environments where mobile equipment, or the like, is probably used most often, it is believed that a minimum reflectance of about 4% is required for recognizing the display because such environments are darker than outdoor environments. According to the measurement results shown in FIG. 6, the color filter opening proportion at which the reflectance is 4% is 5%. Thus, it is preferred to set the lower limit of the color filter opening proportion to be 5%.

FIG. 7 is a graph illustrating the reflectance and the transmittance for various reflection film opening proportions. The measurement results shown in FIG. 7 were obtained by using a color filter having an opening proportion of 10% and a Y value of 40. The lower limit of the transmittance is dependent on various factors such as the output luminance level of the back lamp. For example, a back lamp capable of providing an output luminance of about 1000 $cd/m^2$ is used in display devices of portable telephones. Under office and darker environments, the display is sufficiently recognizable if the luminance in a transmission mode is 10 $cd/m^2$ or more. Thus, a reflectance of about 1% is sufficient for display devices of portable telephones. According to the results shown in FIG. 7, the reflection film opening proportion at which the reflectance is 1% is 10%. Thus, it is preferred that the lower limit of the reflection film opening proportion is 10%. As described above, a reflectance of about 4% is required for use under office environments. According to the results shown in FIG. 7, the reflection film opening proportion at which the reflectance is 4% is 50%. Thus, it is preferred that the upper limit of the reflection film opening proportion is 50%.

The liquid crystal display device of the present embodiment includes the overcoat layer 9 made of an acrylic resin and formed on the color filter 10. The overcoat layer 9 is for flattening the irregular surface of the color filter 10 so that the liquid crystal molecules rise in a uniform manner. In the case of a liquid crystal display device in which a color filter is provided on one substrate and a reflection film is provided on the other substrate, it is necessary to form an overcoat layer on each of the color filter and the reflection film. In contrast, in the liquid crystal display device of the present embodiment, the color filter 10 is layered on the reflection film 11, whereby it is only necessary to provide the overcoat layer 9 on the color filter 10, thereby simplifying the production process. Also when a diffused reflection film is used as the reflection film, the surface irregularities are eliminated by the overcoat layer 9.

Figure 8:
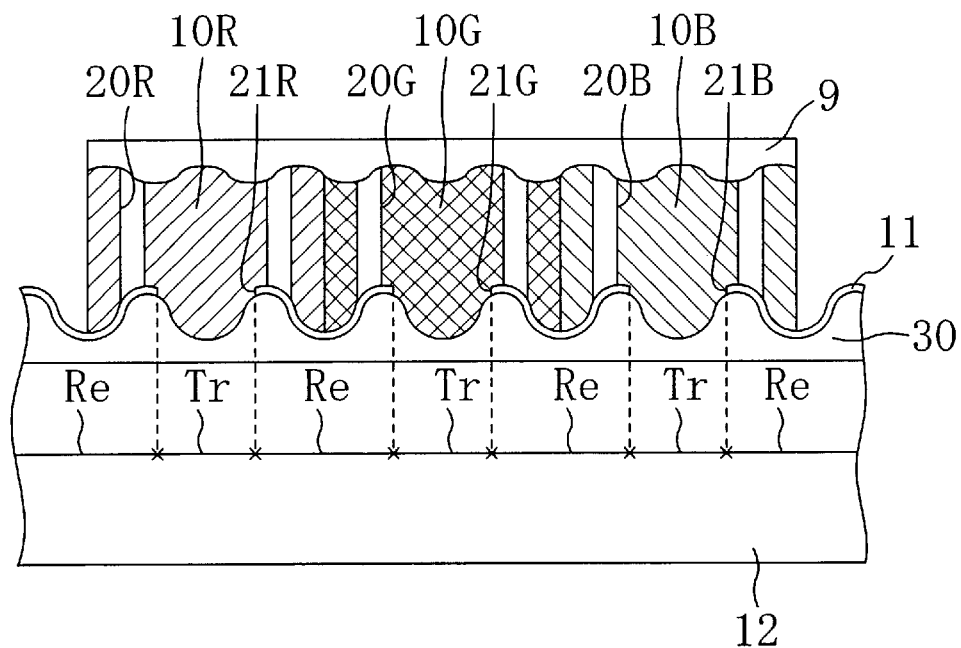
FIG. 8 is a cross-sectional view schematically illustrating a lower substrate having a diffused reflection film.

FIG. 8 is a cross-sectional view schematically illustrating a lower substrate having a diffused reflection film. The diffused reflection film includes a transparent resin layer 30 made of an acrylic resin, or the like, and having a surface with smooth irregularities, and the reflection film 11 layered on the transparent resin layer 30. The transparent resin layer 30 is produced by, for example, the following step. A photosensitive resin film is formed on the lower substrate 12, and a plurality of openings are formed therein by a photolithography method. Then, a heat treatment is performed, whereby the surface is deformed by a heat deformation phenomenon, thus rounding off sharp edges of the openings and obtaining a surface with smooth irregularities. If a diffused reflection film is used as the reflection film, reflected light from the diffused reflection film passes through the color filter 10 to the upper substrate 4 side while being diffused in a reflection display mode, whereby the brightness and the saturation of the combined output light are made uniform across each pixel, thus improving the visibility. Alternatively, an overcoat film made of a transparent resin with a light diffusing substance dispersed therein may be separately formed, as a diffusion layer, on the reflection film 11 that is provided with a mirror finished surface so as to provide the liquid crystal display device with a light diffusing function.

In a case where the color filter 10 has a large thickness, i.e., in a case where each opening 20 of the color filter 10 is deep, the step between the color filter portion and the opening 20 may be excessive so that the step cannot be eliminated by the overcoat layer 9, resulting in insufficient flattening. Particularly, in a display device using an STN liquid crystal layer, the presence of such a step delays the rise of the liquid crystal molecules in the vicinity of each color filter opening 20, thereby making the rise of the liquid crystal molecules non-uniform across each pixel, thus causing problems such as a reduced contrast in a reflection display mode.

Figure 9:
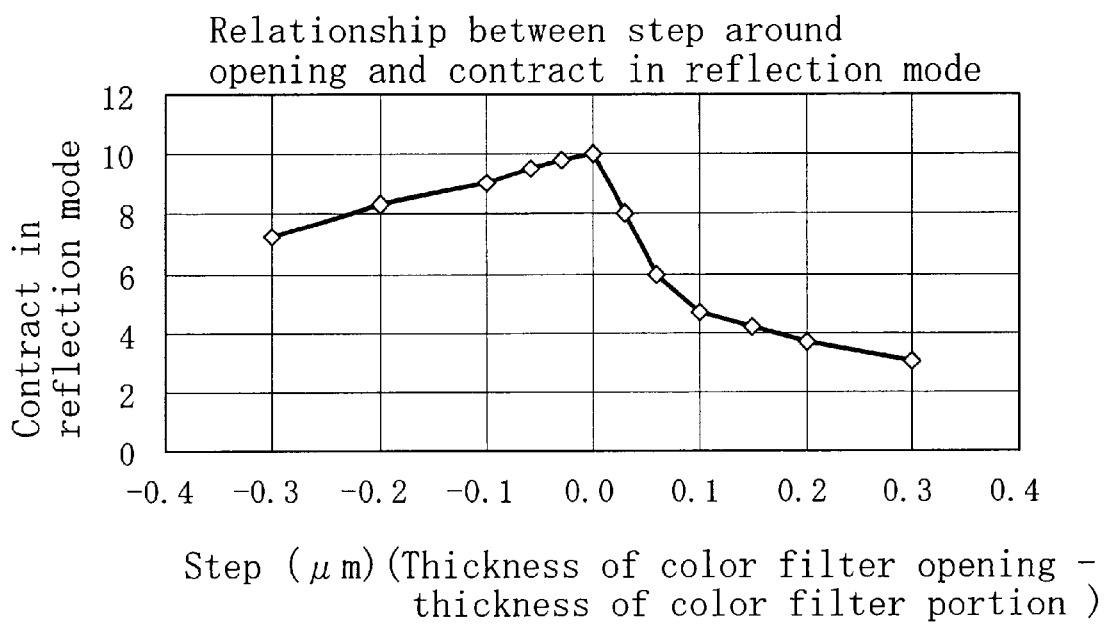
FIG. 9 is a graph illustrating the relationship between the step between a color filter portion and a color filter opening and the contrast in a reflection display mode.

FIG. 9 is a graph illustrating the relationship between the step between the color filter portion and the color filter opening and the contrast in a reflection display mode. The step between the color filter portion and the color filter opening was measured with a profilometer using a substrate that has been subjected to an alignment process (i.e., a substrate immediately before the attachment of the upper and lower substrates to each other) taking into consideration the flatness of the various films to be deposited on the color filter 10. Moreover, step adjustment was performed by filling each opening 20 of the color filter 10 with a transparent resin using a color filter material having a transmittance of 95% to which only a pigment for tint correction had been added.

In a case where a color filter is produced by using an electrodeposition ITO film including openings therein, since a transparent resin cannot be electrodeposited on the openings 20 of the color filter 10, a transparent resin is electrodeposited on the openings 20 by using a resist direct electrodeposition method. A resist direct electrodeposition method is a method in which a photosensitive resin applied on an electrodeposition ITO film is patterned so as to partially expose the electrodeposition ITO film, and an electrodeposition color filter is formed on the exposed portions. With this method, R, G and B color filters and a transparent resin layer in the openings 20 can be formed.

It can be seen from FIG. 9 that the reflection contrast improves as the step decreases. Specifically, if the color filter portion thickness is greater than the color filter opening thickness (i.e., the thickness of the resin filling the opening), the liquid crystal molecules in the vicinity of each color filter opening 20 rise later than other liquid crystal molecules, whereas if the color filter opening thickness is greater than the color filter portion thickness, the liquid crystal molecules in the vicinity of each color filter opening 20 rise earlier than other liquid crystal molecules. In either case, the contrast is reduced. Therefore, it is preferred to adjust the thickness of the transparent resin that fills each opening 20 so that there is no step between the opening and the color filter portion.

While each opening 20 of the color filter 10 is a through hole running through the color filter 10 in the thickness direction thereof in the present embodiment, the opening 20 may alternatively have a depth less than the thickness of the color filter 10 as long as it is possible to ensure a transmittance of 90% or more, and preferably 95% or more, in the opening 20.

In the liquid crystal display device of the present embodiment, the transparent display electrodes 5a and 5b are formed on one side of the upper substrate 4 and the lower substrate 12, respectively, closer to the STN liquid crystal layer 8. The transparent electrodes 5a and 5b are formed by depositing (through a vapor deposition process) and etching ITO (indium tin oxide) on the upper substrate 4 and on the overcoat layer (flattening layer) 9 of the lower substrate 12 each into a stripe pattern. Regions where the stripe patterns cross each other form pixel electrodes, which are arranged in a matrix pattern. A black matrix may be formed using a light-absorbing material so as to surround each pixel, in which case the light blocking effect is improved, thus contributing to an increase in the contrast. A polyimide resin is applied by printing on the transparent display electrodes 5a and 5b, and the polyimide resin is sintered so as to form the alignment films 7a and 7b. Then, the alignment films 7a and 7b are subjected to a rubbing treatment so that the twist angle of the liquid crystal molecules is 240°.

After the upper and lower substrates 4 and 12 are attached to each other via the seal resin 6, a liquid crystal material whose birefringence Δn and pitch have been adjusted is injected into a gap therebetween, thereby forming the STN liquid crystal layer 8 and thus producing an STN liquid crystal cell. Then, the first phase plate 2, the second phase plate 3 and the third phase plate 13 (each of which is a polycarbonate drawn film having a desired value of dΔn), and the upper polarizer 1 and the lower polarizer 14 (each of which is neutral gray in color) are attached to the liquid crystal cell so that their optical axes are oriented in predetermined directions with respect to the liquid crystal cell. Herein, d is the thickness of the phase plate. Furthermore, the light guide plate 151 and the backlight 161 are provided on one side of the liquid crystal cell that is away from the viewer so that light from the backlight enters the liquid crystal cell.

Figures 10A, 10B:
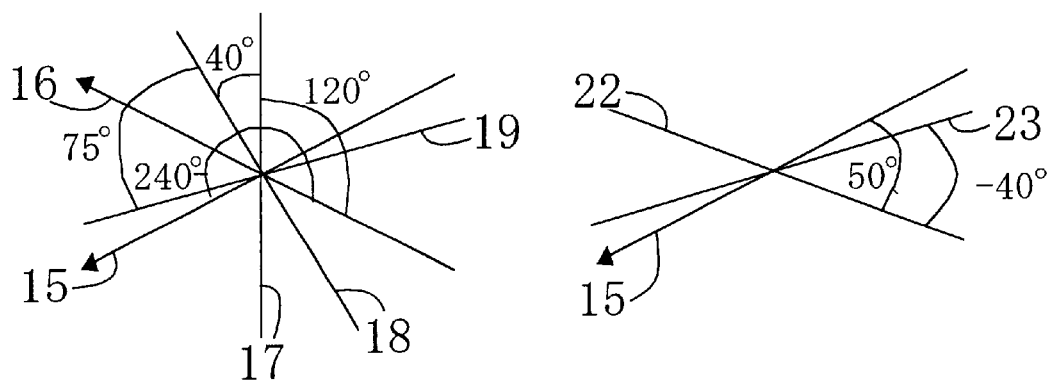
FIG. 10A and FIG. 10B illustrate axial orientations of the optical elements with respect to one another in the embodiment of the present invention.

FIG. 10A and FIG. 10B illustrate axial orientations of the optical elements with respect to one another in the present embodiment. The twist angle of the liquid crystal molecules in the STN liquid crystal layer 8, i.e., the angle between an orientation direction 15 thereof on the lower substrate 12 and an orientation direction 16 thereof on the upper substrate 4, is 240°. With the clockwise and counterclockwise directions being a positive direction and a negative direction, respectively, the angle of the upper orientation direction 16 of the liquid crystal molecules with respect to a slow axis 17 of the second phase plate 3 is 120°, the angle of the slow axis 17 of the second phase plate 3 with respect to a slow axis 18 of the first phase plate 2 is 40°, and the angle of the slow axis 18 of the first phase plate 2 with respect to an absorption axis 19 of the upper polarizer 1 is 75°. Moreover, the angle of a slow axis 22 of the third phase plate 13 with respect to the orientation direction 15 of the liquid crystal molecules on the lower substrate 12 is 50°, and the angle of an absorption axis 23 of the lower polarizer 14 with respect to the slow axis 22 of the third phase plate 13 is −40°.

The retardation values of the STN liquid crystal layer 8, the first phase plate 2, the second phase plate 3 and the third phase plate 13 are set to be 800 nm, 680 nm, 180 nm and 140 nm, respectively, and the liquid crystal display device is configured so as to operate in a normally black mode in a reflection mode and in a transmission mode.

In the liquid crystal display device of the present embodiment, the reflection film 11 including the openings 21 and the color filter 10 including the openings 20 are provided on the lower substrate 12 so that the openings 20 and 21 are located in different positions in each pixel. In this way, the liquid crystal display device of the present embodiment can be obtained without increasing the number of steps in the production process from that in the prior art (see Comparative Example 1 to be described later).

In the case of a liquid crystal display device in which a color filter is provided on one substrate and a reflection film is provided on the other substrate, it is necessary to form an overcoat layer on each of the color filter and the reflection film. In contrast, in the liquid crystal display device of the present embodiment, the color filter 10 is layered on the reflection film 11, whereby it is only necessary to provide the overcoat layer 9 on the color filter 10, thereby simplifying the production process.

Furthermore, in a case where a liquid crystal display device is produced by providing a color filter on one substrate and a reflection film on the other substrate, an opening of the color filter may possibly overlap with an opening of the reflection film when the substrates are attached to each other due to the low alignment precision in the attachment process. In contrast, in the liquid crystal display device of the present embodiment, the openings of the color filter and those of the reflection film are positioned with respect to each other by a photolithography method, which has a high precision, whereby it is possible to prevent problems such as the overlap between openings.

With the liquid crystal display device of the present embodiment, in a transmission display mode where a light source (the backlight 161) provided on the back side of the liquid crystal display device is used, light that is transmitted through the openings 21 of the reflection film 11 passes through the color filter 10 to the outside, thereby obtaining a bright display with a satisfactory display color saturation. A transmission display of desired characteristics can be obtained by adjusting the luminance of the light source, the area and shape of the openings 21 of the reflection film 11, and the saturation, transmittance and thickness of the color filter 10.

In a reflection display mode where ambient light is used, light entering the liquid crystal display device from the front side passes through the color filter 10 or the color filter openings 20, is reflected by the reflection regions (regions other than the openings 21) of the reflection film 11, and passes again through the color filter 10 or the color filter openings 20 to the outside. Therefore, combined output light of non-colored output light and colored output light is obtained, thus realizing a bright display. The brightness and saturation of the output light can be adjusted by adjusting, as necessary, the characteristics of the color filter 10 and the area and shape of the color filter openings 20. By enlarging the color filter openings 20, a color filter having a high color purity can be employed.

In the case of a liquid crystal display device in which a color filter is provided on a viewer-side substrate and a reflection film is provided on a back-side substrate, color mixing may occur since the color filter and the reflection film are spaced apart from each other via a liquid crystal layer. For example, when incident light that has been colored by a blue color filter provided on the viewer-side substrate is reflected by the reflection film provided on the back-side substrate so as to be output to the viewer side, it may pass through a green color filter provided on the viewer-side substrate. In such a case, the output light may become dark while blue and green are mixed with each other, thereby lowering the color purity. In contrast, in the liquid crystal display device of the present embodiment, the color filter is provided on the reflection film, thereby preventing the color purity from being lowered due to color mixing in a reflection display mode.

COMPARATIVE EXAMPLE 1

Comparative Example 1 will now be described with reference to FIG. 11 in comparison with the liquid crystal display device of the present embodiment. The transflective color liquid crystal display device of Comparative Example 1 is as that of the present embodiment except for the color filter and the reflection film. Therefore, only the color filter and the reflection film will be described below.

Figure 11:
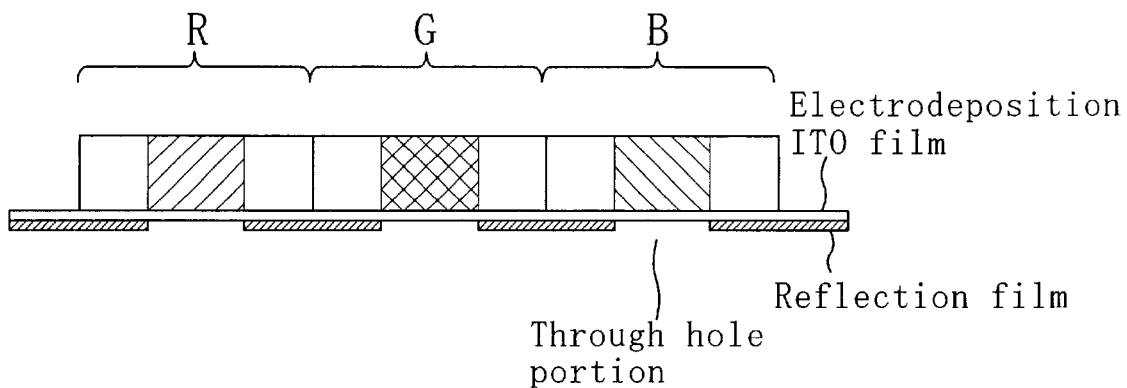
FIG. 11 is a cross-sectional view illustrating a reflection film and a color filter of Comparative Example 1.

The reflection film used in Comparative Example 1 is provided by depositing an aluminum film including light-transmitting through hole portions therein to a thickness of 1000 Å (100 nm) on a lower substrate (not shown), as illustrated in FIG. 11. The area of the through hole portions for each pixel is set to be 30% of the area of each pixel. An RGB color filter having a stripe pattern is formed on the reflection film via an electrodeposition electrode.

In Comparative Example 1, the pigment concentration in color filter portions corresponding to the transmission regions of the reflection film (the reflection film through hole portions in this example) is different from that in other color filter portions corresponding to the reflection regions of the reflection film (the portions of the reflection film other than the through hole portions) as illustrated in FIG. 11. A resist direct electrodeposition method is used so as to produce a color filter with different pigment concentrations between the transmission regions and the reflection regions. With this method, color filter portions with different pigment concentrations are formed in the transmission regions and in the reflection regions for each color.

In this way, it is possible to increase the saturation of a display color in a transmission mode while maintaining the brightness in a reflection mode. However, forming color filter portions of different transmittances in the transmission regions and in the reflection regions increases the number of steps in the color filter electrodeposition process. Specifically, electrodepositing reflection color filter portions and transmission color filter portions for each of R, G and B requires a total of six photolithography steps. Moreover, it requires two color filter materials of different pigment concentrations for each color. Thus, the production cost increases. In contrast, in the liquid crystal display device of the present embodiment, the color filter portions can be electrodeposited in a single photolithography step for each of R, G and B. Even with the photolithography step for providing openings in the electrodeposition ITO film being added, the color filter portions can be electrodeposited through a total of four photolithography steps. Moreover, the color filter portions can be electrodeposited with only one color filter material of one pigment concentration for each color, thereby preventing the production cost from increasing.

Figure 12:
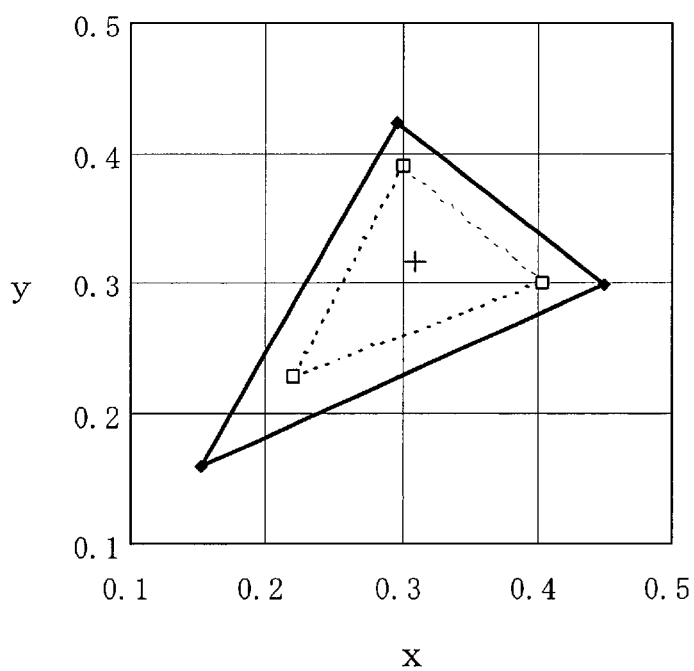
FIG. 12 illustrates characteristics of a color filter used in Comparative Example 1 and those of the color filter used in the embodiment of the present invention.

In Comparative Example 1, a high-transmittance color filter (Y=6) is employed in order to maintain the brightness in a reflection mode. In contrast, the liquid crystal display device of the present embodiment does not require a high-transmittance color filter. For example, the liquid crystal display device of the embodiment as described above employs a color filter having a Y value of 43. FIG. 12 illustrates characteristics of the color filter used in Comparative Example 1 and those of the color filter used in the embodiment of the present invention. It can be seen from the chromaticity diagram of FIG. 12 that the liquid crystal display device of the present embodiment is preferred also in terms of saturation.

Embodiments 2, 3 and 4 of the present invention will now be described with reference to the drawings. In Embodiments 2, 3 and 4 below, the present invention will be described with respect to cases where a plastic substrate such as polyethersulfone, polycarbonate, an epoxy resin, or polyethylene terephthalate, is used as the upper substrate 4 and the lower substrate 12. Liquid crystal display devices of Embodiments 2, 3 and 4 are structurally similar to the liquid crystal display device of Embodiment 1 illustrated in FIG. 1. Therefore, the liquid crystal display devices of Embodiments 2, 3 and 4 will be described using the reference numerals shown in FIG. 1, and the structures thereof will not be described in detail.

EMBODIMENT 2

Figure 13:
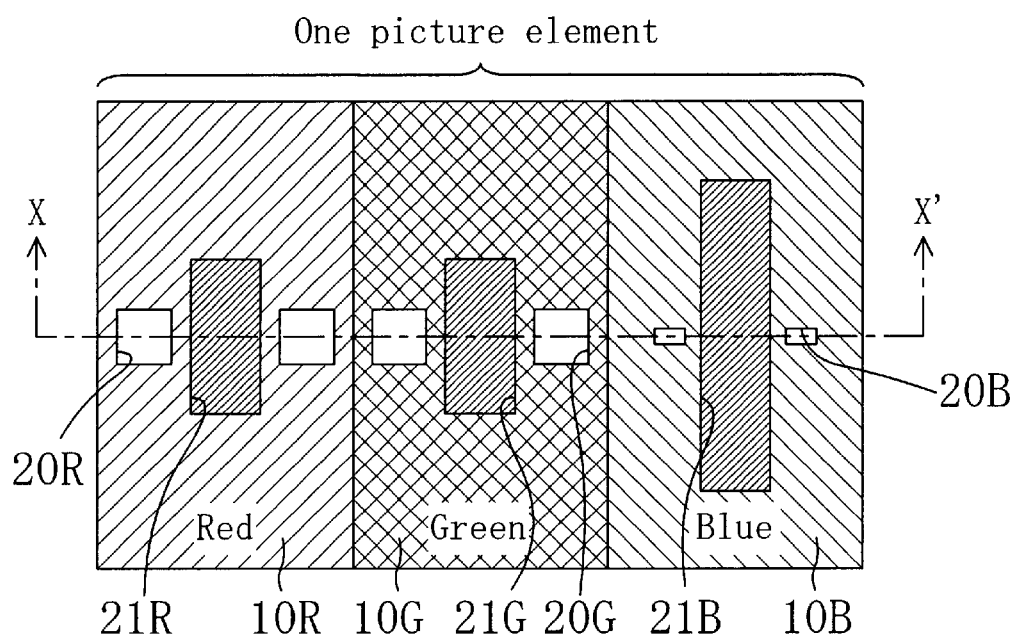
FIG. 13 is a plan view schematically illustrating one pixel of a liquid crystal display device of Embodiment 2.
Figure 14:
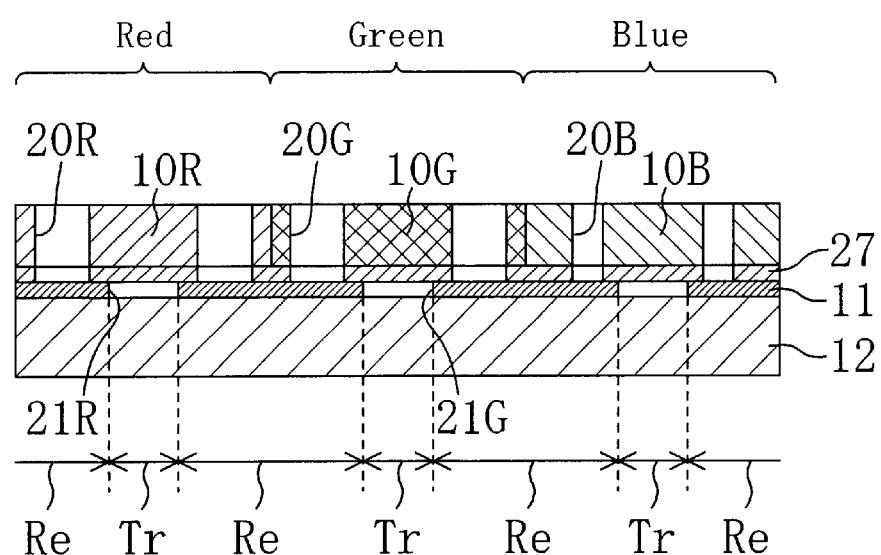
FIG. 14 is a cross-sectional view taken along line x–x' of FIG. 13.

FIG. 13 is a plan view schematically illustrating one pixel of the liquid crystal display device of Embodiment 2, and FIG. 14 is a cross-sectional view illustrating the same taken along line x–x'. In the present embodiment, three pixels of different hues (R, G and B) together form a picture element. The R, G and B color filters 10R, 10G and 10B include a number of respective openings 20R, 20G and 20B within a pixel region. In the present embodiment, the color filters 10R, 10G and 10B include two rectangular openings 20R, 20G and 20B, respectively, in each pixel region.

In the present embodiment, the color filter 10B in a blue pixel region has openings the size (area) of which is smaller than those of the color filters 10R and 10G in red and green pixel regions. Therefore, the blue color filter 10B, among the R, G and B color filters 10R, 10G and 10B, has the largest color filter area for coloring the reflected light from the reflection film 11.

Moreover, in the present embodiment, the reflection film 11 includes, in transmission regions Tr, the openings 21R, 21G and 21B for transmitting light from the backlight 161 in the R, G and B pixel regions, respectively. The openings 21R, 21G and 21B in the pixel regions are positioned so as not to overlap with the openings 20R, 20G and 20B of the color filters 10R, 10G and 10B, respectively. In other words, the openings 20R, 20G and 20B of the color filters 10R, 10G and 10B are provided in the reflection regions Re of the reflection film 11.

The total area of each of the openings 21R, 21G and 21B for each pixel is preferably equal to or greater than 10% and less than or equal to 50% of the area of one pixel region, and is set to be 30%, for example. If it is less than 10%, the amount of light transmitted therethrough is excessively small, resulting in a dark display in a transmission display mode. If it is over 50%, while a sufficient display is realized in a transmission mode, the display becomes dark in a reflection mode, thereby resulting in a poor visibility.

In the present embodiment, the reflection film 11 includes, in a blue pixel region, an opening the size (area) of which is greater than that in red and green pixel regions. Therefore, the blue color filter 10B, among the R, G and B color filters 10R, 10G and 10B, has the largest color filter area for coloring the transmitted light from the backlight 161.

The color liquid crystal display device of the present embodiment provides improved spectral characteristics of combined reflected light (made of R light, G light and B light), and the reflected light can be light of a desired white color. Moreover, the color liquid crystal display device provides improved spectral characteristics of combined transmitted light (made of R light, G light and B light) from the backlight 161, and the transmitted light can be light of a desired white color.

The size of the opening 20 of the color filter 10 and the size of the opening 21 of the reflection film 11 are determined so as to optimize the color reproducibility in a color display in a reflection display mode and in a transmission display mode. For example, where the opening 21B of the reflection film 11 in the blue pixel region is excessively large, even if the size of the opening 20B of the color filter 10B in the blue pixel region is reduced, the area of the color filter 10B for coloring the reflected light from the reflection film 11 in blue is smaller than those of the other two color filters 10R and 10G for coloring the reflected light in the respective hues, whereby the color imbalance in a reflection display mode may not be correctable. Therefore, in the present embodiment, the size of the opening 21B of the reflection film 11 in the blue pixel region is set to be greater than those of the openings 21R and 21G of the reflection film 11 in the red and green pixel regions, while the sizes (areas) of the openings 20R, 20G and 20B of the color filter 10 are determined so that the area of the color filter 10B for coloring the reflected light in blue is greater than those of the other two color filters 10R and 10G for coloring the reflected light in the respective hues.

A method for producing a color liquid crystal display device of the present embodiment will now be described. First, aluminum is deposited through a vapor deposition process to a thickness of 100 nm on the lower plastic substrate 12 so as to form the reflection film 11. The reflection film may be a film having a high reflectance such as an Al film, an Ag film and an Ag alloy film (e.g., an Ag—Pd film). The aluminum film is patterned by using a photolithography method so as to form the light-transmitting through holes (openings) 21R, 21G and 21B. The aluminum film patterning process is performed so that the area of the opening 21B of the reflection film 11 corresponding to the blue pixel region is greater than those of the openings 21R and 21G of the reflection film 11 corresponding to the red and green pixel regions, respectively.

Then, an electrodeposition ITO film (electrode) 27 is formed across the entire surface of the lower plastic substrate 12 in preparation for the electrodeposition of the color filter 10. The electrodeposition ITO film (electrode) 27 is patterned so that portions thereof are removed from regions where the openings 20R, 20G and 20B are to be formed in preparation for the formation of the openings 20R, 20G and 20B in the color filters 10R, 10G and 10B. The patterning of the electrodeposition ITO film (electrode) 27 is performed so that the area of the opening 20B of the blue color filter 10B is smaller than those of the openings 20R and 20G of the red and green color filters 10R and 10G. The color filter 10 may alternatively be formed by any other method known in the art, such as a printing method or a pigment dispersion method.

Furthermore, the overcoat film (flatting film) 9 made of an acrylic resin is formed on the lower plastic substrate 12. The formation of the overcoat film (flatting film) 9 may be optional.

The transparent display electrodes 5 each arranged in a matrix pattern are formed by depositing (through a vapor deposition process) and etching ITO (indium tin oxide) on the upper plastic substrate 4 and on the overcoat film (flatting film) 9 of the lower plastic substrate 12. A black matrix may be formed using a light-absorbing material so as to surround each pixel, in which case the light blocking effect is improved, thus contributing to an increase in the contrast. A polyimide resin is applied by printing on the transparent display electrodes 5, and the polyimide resin is sintered so as to form the alignment films 7. Then, the alignment films 7 are subjected to a rubbing treatment so that the twist angle of the liquid crystal molecules is 240°.

After the upper and lower substrates 4 and 12 are attached to each other via the seal resin 6, a liquid crystal material whose birefringence Δn and pitch have been adjusted is injected into a gap therebetween, thereby forming the STN liquid crystal layer 8 and thus producing an STN liquid crystal cell. Then, the first phase plate 2, the second phase plate 3 and the third phase plate 13 (each of which is a polycarbonate drawn film having a desired value of dΔn), and the upper polarizer 1 and the lower polarizer 14 (each of which is neutral gray in color) are attached to the liquid crystal cell so that their optical axes are oriented in predetermined directions with respect to the liquid crystal cell. Herein, d is the thickness of the phase plate. Furthermore, the light guide plate 151 and the backlight 161 are provided on one side of the liquid crystal cell that is away from the viewer so that light from the backlight enters the liquid crystal cell.

In the color liquid crystal display device of the present invention, the area proportion of the opening in the reflection region corresponding to each of red, green and blue pixels (area of opening/area of reflection region) can be selected depending on the spectral characteristics of the light source (including natural light), the color filter, etc., in a reflection mode, or the reflection characteristics of the plastic substrates. Moreover, the area proportion of the opening in the transmission region corresponding to each of red, green and blue pixels (area of opening/area of transmission region) can be selected depending on the spectral characteristics of the backlight, the color filter, etc., in a transmission mode, or the transmission characteristics of the plastic substrates.

COMPARATIVE EXAMPLE 2

Figure 15:
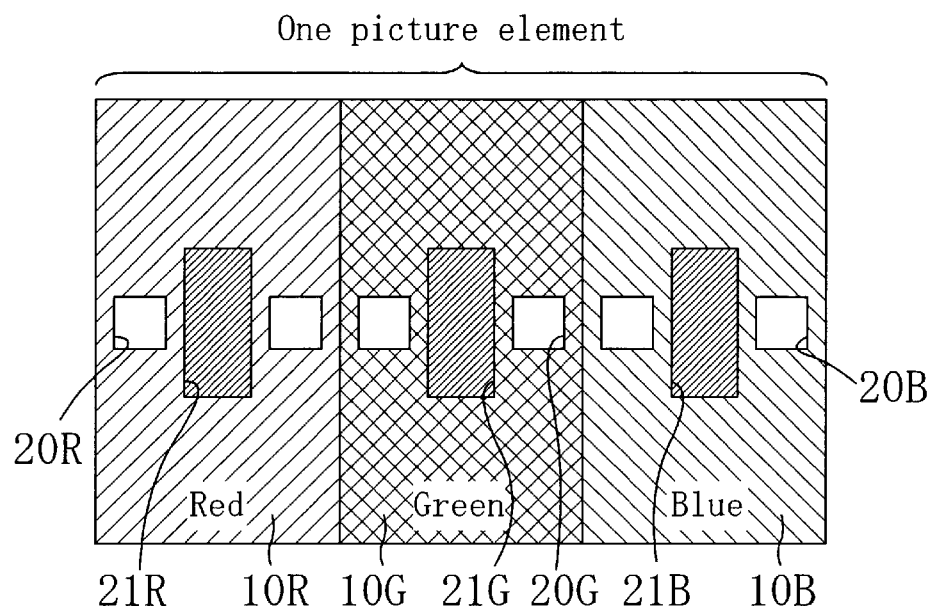
FIG. 15 is a plan view schematically illustrating one pixel of a liquid crystal display device of Comparative Example 2.

Comparative Example 2 will now be described with reference to FIG. 15 in comparison with the liquid crystal display device of Embodiment 2. In Comparative Example 2, the openings 20R, 20G and 20B of the color filters 10R, 10G and 10B in the R, G and B pixel regions have an equal size (area) among the R, G and B pixels. Moreover, the openings 21R, 21G and 21B of the reflection film 11 in the R, G and B pixel regions have an equal size (area) among the R, G and B pixels. Therefore, light is transmitted through an equal area of the color filters 10 in the R, G and B pixel regions in a reflection display mode and in a transmission display mode.

In the color liquid crystal display device of Comparative Example 2, if the colorless and transparent plastic substrate gets yellowish through a production process such as heating during a color filter deposition, a transparent electrode film deposition or an alignment film deposition, the color displayed image as a whole gets yellowish not only in a reflection display mode but also in a transmission display mode, thereby causing a decrease in the color reproducibility.

EMBODIMENT 3

Figure 16:
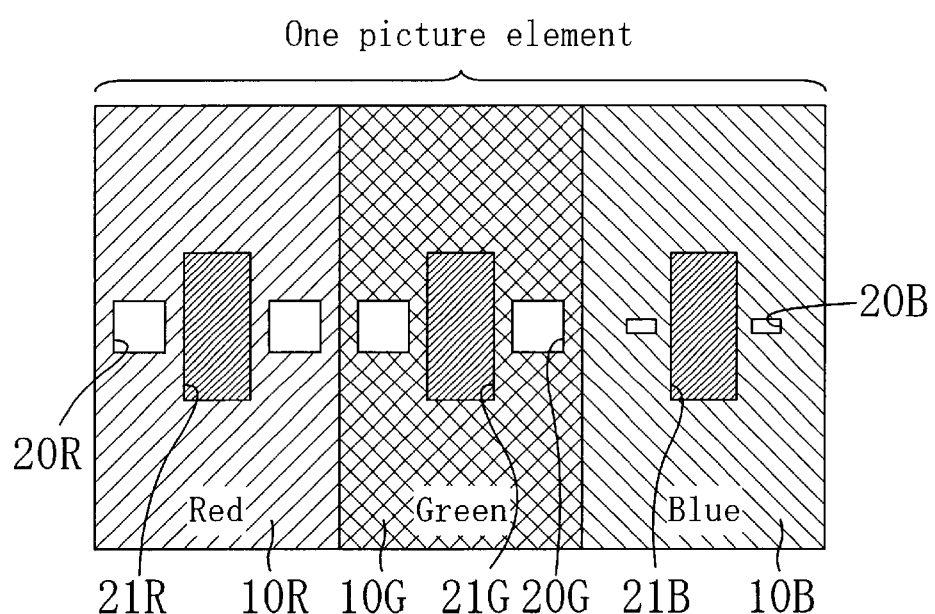
FIG. 16 is a plan view schematically illustrating one picture element in a transflective color liquid crystal display device of Embodiment 3.

FIG. 16 is a plan view schematically illustrating one picture element in a transflective color liquid crystal display device of Embodiment 3. The color liquid crystal display device of the present embodiment is different from that of Embodiment 2 in that the openings 21R, 21G and 21B of the reflection film 11 in the R, G and B pixel regions have an equal size (area) among the R, G and B pixels.

In the color liquid crystal display device of the present embodiment, the size (area) of the opening 20B of the color filter 10B in the blue pixel region is smaller than those of the openings 20R and 20G of the color filters 10R and 10G in the red and green pixel regions. Therefore, the blue color filter 10B, among the R, G and B color filters 10R, 10G and 10B, has the largest color filter area for coloring the reflected light from the reflection film 11.

With the color liquid crystal display device of the present embodiment, if the upper plastic substrate 4 gets yellowish through a production process, the area proportion (area of opening/area of reflection region) of the color filter 10B of blue, which is approximately the complementary color to yellow, can be increased relative to those of the red and green color filters 10R and 10G. Therefore, the reflected light can be approximately white light in a reflection display mode, thereby realizing a reflection color display with a desirable color reproducibility.

EMBODIMENT 4

Figure 17:
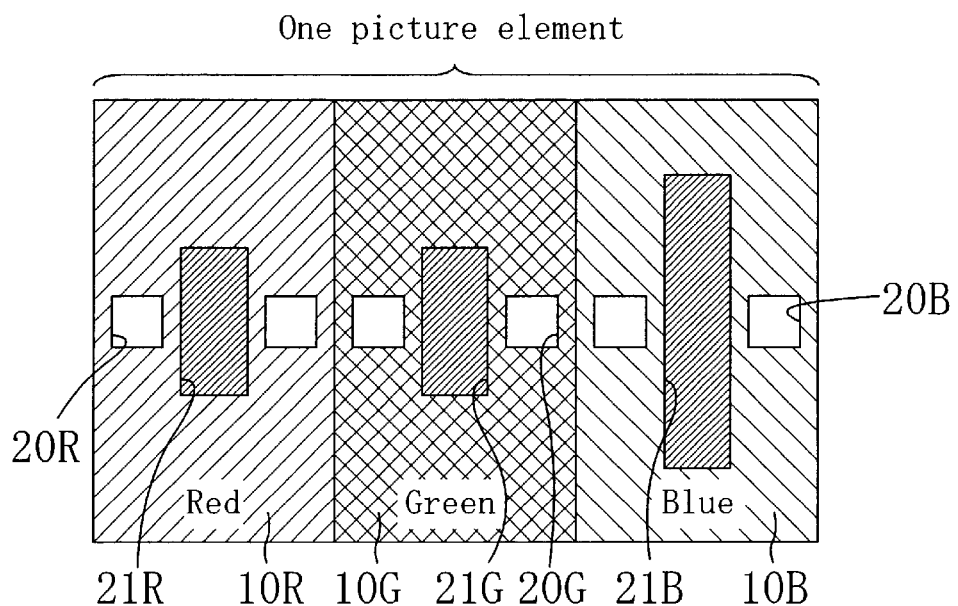
FIG. 17 is a plan view schematically illustrating one picture element in a transflective color liquid crystal display device of Embodiment 4.

FIG. 17 is a plan view schematically illustrating one picture element in a transflective color liquid crystal display device of Embodiment 4. The color liquid crystal display device of the present embodiment is different from that of Embodiment 2 in that the openings 20R, 20G and 20B of the color filters 10R, 10G and 1-B in the R, G and B pixel regions have an equal size (area) among the R, G and B pixels.

In the color liquid crystal display device of the present embodiment, the size (area) of the opening 21B of the reflection film 11 in the blue pixel region is greater than those of the openings 21R and 21G of the reflection film 11 in the red and green pixel regions. Therefore, the blue color filter 10B, among the R, G and B color filters 10R, 10G and 10B, has the largest color filter area for coloring the transmitted light from the backlight.

With the color liquid crystal display device of the present embodiment, if the two plastic substrates 4 and 12 get yellowish through a production process, the area proportion (area of opening/area of transmission region) of the color filter 10B of blue, which is approximately the complementary color to yellow, can be increased relative to those of the red and green color filters 10R and 10G. Therefore, in a transmission display mode, the transmitted light can be approximately white light in a white display, thereby realizing a transmission color display with a desirable color reproducibility.

ALTERNATIVE EMBODIMENTS

In Embodiments 2, 3 and 4, the present invention has been described with respect to a case where the substrates 4 and 12 are plastic substrates. Alternatively, each of the substrates 4 and 12 may be a glass substrate such as a float glass or a soda glass. The liquid crystal display device of Embodiment 1 may employ either a plastic substrate or a glass substrate.

In Embodiments 1 to 4, the reflection film 11 and the color filter 10 are layered on the lower plastic substrate 12. Alternatively, the reflection film 11 and the color filter 10 may be layered on the upper substrate 4. In Embodiments 1 to 4, the present invention has been described with respect to a liquid crystal display device including polarizers. Alternatively, the present invention can be applied to a liquid crystal display device that does not require polarizers such as a guest-host liquid crystal display device or a polymer dispersed liquid crystal display device.

In Embodiments 2, 3 and 4, the present invention has been described with respect to a case where a full color image is displayed by using the three colors of red, green and blue. Alternatively, a full color image may be displayed by using the three colors of magenta, yellow and cyan. In Embodiments 2, 3 and 4, a stripe arrangement is employed. Alternatively, the color liquid crystal display device of the present invention may employ any other type of pixel arrangement, such as a delta arrangement, a mosaic arrangement, or a square arrangement. In the color liquid crystal display device of the present invention, the number of hues of pixels to be provided may alternatively be 4 or more.

In Embodiments 2, 3 and 4, the present invention has been described with respect to a case where the size of the opening 20B of the color filter 10B and the size of the opening 21B of the reflection film 11 in the blue pixel region are different respectively from those of the openings 20R and 20G of the color filters 10R and 10G and those of the openings 21R and 21G of the reflection film 11 in the red and green pixel regions. Alternatively, the size of the opening in either one of the red and green pixel regions may be different from those of the openings in the pixel regions of the other two colors. Moreover, the openings 20R, 20G and 20B and 21R, 21G and 21B in the pixel regions of the respective hues of red, green and blue may alternatively have area proportions (area of opening/area of reflection region, or area of opening/area of transmission region) that are different from one another.

REFERENCE EXAMPLE 1

Figure 18:
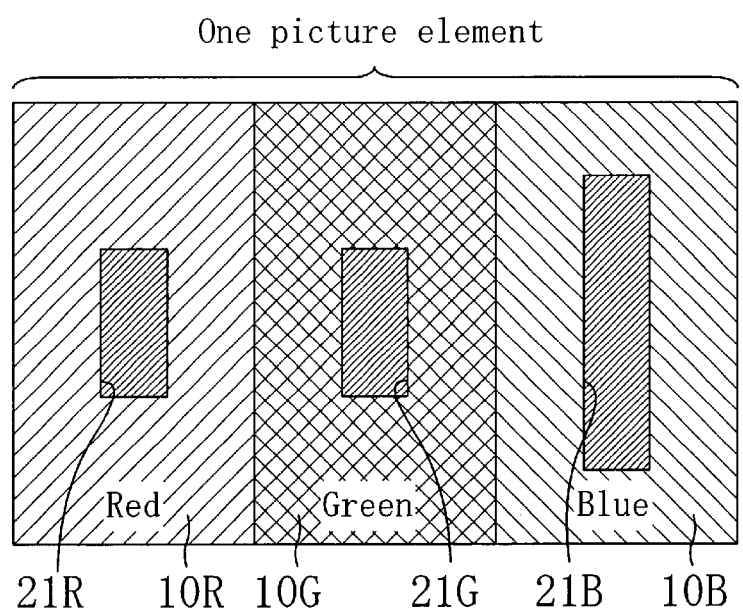
FIG. 18 is a plan view schematically illustrating one picture element in a liquid crystal display device of Reference Example 1.

In the color liquid crystal display device of the present invention, the color filter includes openings. However, even when the color filters 10R, 10G and 10B of the respective hues include no openings, as illustrated in FIG. 18, it is possible to realize a transmission color display with a desirable color reproducibility in a transmission display mode, as long as the reflection film 11 includes the openings 21R, 21G and 21B in the respective pixel regions, and the size of the opening (e.g., the opening 21B) in at least one of the pixel regions of different colors (e.g., the blue pixel region) is greater than those of the openings (e.g., the openings 21R and 21G) in the other pixel region(s) (e.g., the red and green pixel regions).

Specifically, in the illustrated example, the size (area) of the opening 21B of the reflection film 11 in the blue pixel region is greater than those of the openings 21R and 21G of the reflection film 11 in the red and green pixel regions, whereby the blue color filter 10B, among the R, G and B color filters 10R, 10G and 10B, has the largest color filter area for coloring the transmitted light from the backlight. Therefore, if two plastic substrates get yellowish through a production process, the area proportion of the color filter of blue, which is approximately the complementary color to yellow, can be increased relative to those of the red and green color filters. Therefore, in a transmission display mode, the transmitted light can be approximately white light in a white display, thereby realizing a transmission color display with a desirable color reproducibility.

REFERENCE EXAMPLE 2

Figure 19:
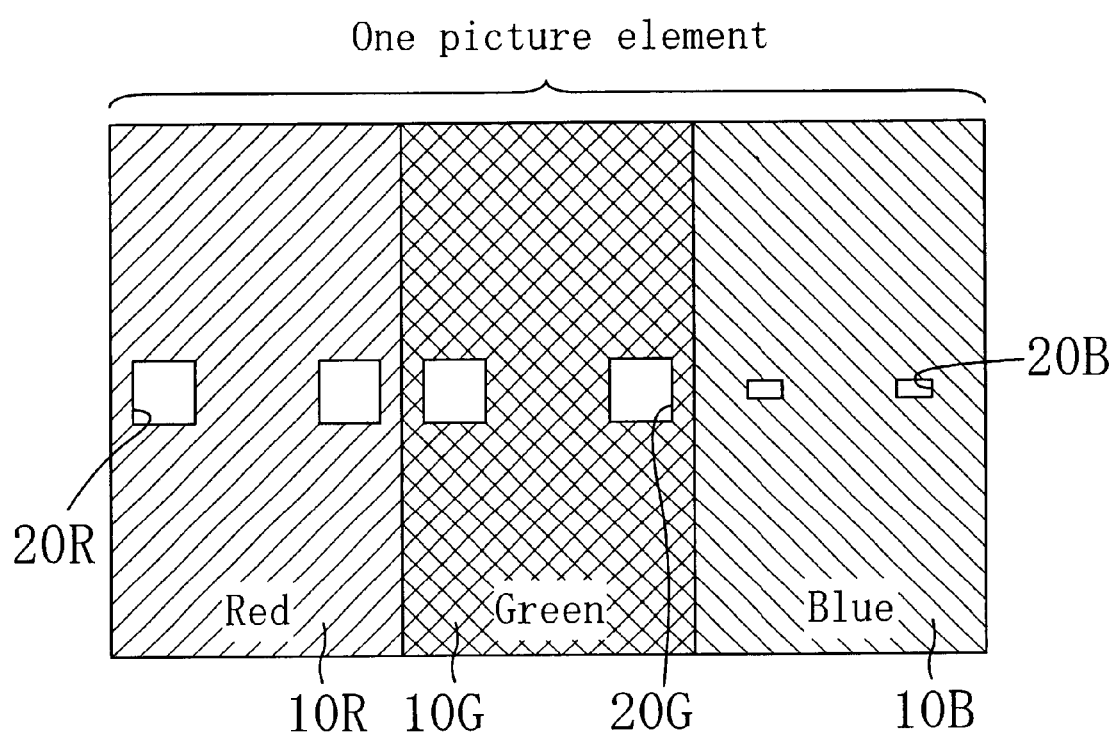
FIG. 19 is a plan view schematically illustrating one picture element in a liquid crystal display device of Reference Example 2.

The color liquid crystal display device of the present invention is a transflective color liquid crystal display device in which the reflection film includes openings. However, even with a reflection type color liquid crystal display device in which the reflection film includes no opening, as illustrated in FIG. 19, it is possible to realize a reflection color display with a desirable color reproducibility in a reflection display mode, as long as the color filters 10R, 10G and 10B of the respective hues include the openings 20R, 20G and 20B, respectively, and the size of the opening (e.g., the opening 20B) in at least one of the pixel regions of different colors (e.g., the blue pixel region) is smaller than those of the openings (e.g., the openings 20R and 20G) in the other pixel region(s) (e.g., the red and green pixel regions).

Specifically, in the illustrated example, the size (area) of the opening 20B of the color filter 10B in the blue pixel region is smaller than those of the openings 20R and 20G of the color filters 10R and 10G in the red and green pixel regions, whereby the blue color filter 10B, among the R, G and B color filters 10R, 10G and 10B, has the largest color filter area for coloring the reflected light from the reflection film. Therefore, if the upper plastic substrate gets yellowish through a production process, the area proportion of the color filter 10B of blue, which is approximately the complementary color to yellow, can be increased relative to those of the red and green color filters 10R and 10G. Thus, in a reflection display mode, the reflected light can be approximately white light in a white display, thereby realizing a reflection color display with a desirable color reproducibility.

REFERENCE EXAMPLE 3

Even with a transmission type color liquid crystal display device including no reflection film, it is possible to realize a transmission color display with a desirable color reproducibility in a transmission display mode, as in Reference Example 2, as long as the color filters 10R, 10G and 10B of the respective hues include the openings 20R, 20G and 20B, respectively, and the size of the opening (e.g., the opening 20B) in at least one of the pixel regions of different colors (e.g., the blue pixel region) is smaller than those of the openings (e.g., the openings 20R and 20G) in the other pixel region(s) (e.g., the red and green pixel regions).

Specifically, if the size (area) of the opening 20B of the color filter 10B in the blue pixel region is smaller than those of the openings 20R and 20G of the color filters 10R and 10G in the red and green pixel regions, the blue color filter 10B, among the R, G and B color filters 10R, 10G and 10B, has the largest color filter area for coloring the transmitted light from the backlight. Therefore, if two plastic substrates get yellowish through a production process, the area proportion of the color filter of blue, which is approximately the complementary color to yellow, can be increased relative to those of the red and green color filters. Therefore, in a transmission display mode, the transmitted light can be approximately white light in a white display, thereby realizing a transmission color display with a desirable color reproducibility.

According to the present invention, the liquid crystal display device of the present invention can be obtained without any additional step to a conventional production process, by providing a reflection film including openings and a color filter also including openings on one of the substrates so that the openings of the reflection film and the openings of the color filter do not overlap with each other in each pixel.

Furthermore, with the liquid crystal display device of the present invention, in a transmission display mode where a light source provided on the back side of the liquid crystal display device is used, light that is transmitted through the openings of the reflection film passes through the color filter to the outside, thereby obtaining a bright display with a satisfactory display color saturation.

In a reflection display mode where ambient light is used, light entering the liquid crystal display device from the front side passes through the color filter or the color filter openings, is reflected by the reflection regions of the reflection film, and passes again through the color filter or the color filter openings to the outside, whereby combined output light of non-colored output light and colored output light is obtained, thus realizing a bright display.

Furthermore, the brightness and saturation of the output light can be adjusted by adjusting, as necessary, the characteristics of the color filter and the area and shape of the color filter openings, thereby allowing a color filter having a high color purity to be employed.

Thus, the liquid crystal display device of the present invention is useful as a transflective color liquid crystal display device, particularly as a transflective color liquid crystal display device in which a transmission display mode is given a higher priority, and it is possible to improve the display color saturation in a transmission display mode while maintaining the brightness and contrast in a reflection display mode without increasing the number of steps in the production process.

Moreover, with the liquid crystal display device of the present invention, it is possible to realize a transmission and/or reflection color display with a desirable color reproducibility.

While the present invention has been described in preferred embodiments, it will be apparent to those skilled in the art that the disclosed invention may be modified in numerous ways and may assume many embodiments other than those specifically set out and described above. Accordingly, it is intended by the appended claims to cover all modifications of the invention that fall within the true spirit and scope of the invention.

What is claimed is:

1. A liquid crystal display device, comprising:
    a first substrate;
    a second substrate opposing the first substrate;
    a liquid crystal layer interposed between the first substrate and the second substrate;
    a reflection film formed on one side of the second substrate that is closer to the liquid crystal layer; and
    a color filter formed on the reflection film, wherein:
        a plurality of pixel regions are arranged in a matrix pattern, each of the pixel regions including a reflection region where light coming from the first substrate side is reflected by the reflection film back to the first substrate side, and a transmission region where light coming from the second substrate side is transmitted to the first substrate side; and
        the color filter includes an opening in the reflection region.

2. The liquid crystal display device of claim 1, wherein the color filter includes a plurality of openings in the reflection region.

3. The liquid crystal display device of claim 1, wherein the reflection film is a diffused reflection film whose surface on the liquid crystal layer side has irregularities.

4. The liquid crystal display device of claim 1, wherein an area proportion of the transmission region with respect to the pixel region is equal to or greater than 10% and less than or equal to 50%, and an area proportion of the opening with respect to the reflection region is equal to or greater than 5% and less than or equal to 30%.

5. The liquid crystal display device of claim 1, wherein the openings of the color filter are filled with a transparent resin whose transmittance is 90% or more.

6. The liquid crystal display device of claim 1, wherein:
    a plurality of picture element regions are defined, each including a number of the pixel regions of different colors; and
    in each of the plurality of picture element regions, an area of the opening of the color filter in at least one of the pixel regions of different colors is smaller than an area of the opening of the color filter in each of the other pixel region(s).

7. The liquid crystal display device of claim 1, wherein:
    the first substrate is a plastic substrate;
    a plurality of picture element regions are defined, each including three of the pixel regions of red, green and blue; and
    in each of the plurality of picture element regions, an area of the opening of the color filter in the blue pixel region is smaller than an area of the opening of the color filter in each of the red and green pixel regions.

8. The liquid crystal display device of claim 1, wherein:
    a plurality of picture element regions are defined, each including a number of the pixel regions of different colors; and
    in each of the plurality of picture element regions, an area of the transmission region in at least one of the pixel regions of different colors is greater than an area of the transmission region in each of the other pixel region(s).

9. The liquid crystal display device of claim 1, wherein:

at least one of the first substrate and the second substrate is a plastic substrate;

a plurality of picture element regions are defined, each including three of the pixel regions of red, green and blue; and in each of the plurality of picture element regions, an area of the transmission region in the blue pixel region is greater than an area of the transmission region in each of the red and green pixel regions.

10. The liquid crystal display device of claim 1, wherein:

a plurality of picture element regions are defined, each including a number of the pixel regions of different colors; and in each of the plurality of picture element regions, an area of the opening of the color filter in at least one of the pixel regions of different colors is smaller than an area of the opening of the color filter in each of the other pixel region(s), and an area of the transmission region in at least one of the pixel regions of different colors is greater than an area of the transmission region in each of the other pixel region(s).

11. The liquid crystal display device of claim 1, wherein:

at least one of the first substrate and the second substrate is a plastic substrate;

a plurality of picture element regions are defined, each including three of the pixel regions of red, green and blue; and in each of the plurality of picture element regions, an area of the opening of the color filter in the blue pixel region is smaller than an area of the opening of the color filter in each of the red and green pixel regions, and an area of the transmission region in the blue pixel region is greater than an area of the transmission region in each of the red and green pixel regions.

* * * * *